United States Patent [19]

Bugaenko et al.

[11] Patent Number: 4,611,625
[45] Date of Patent: Sep. 16, 1986

[54] LIQUID PRESSURE REGULATOR

[75] Inventors: Vitaly F. Bugaenko; Nikolai F. Linsky; Raisa I. Bychkova, all of Dnepropetrovsk; Boris V. Karmugin; Vladimir A. Akopiants, both of Kiev, all of U.S.S.R.

[73] Assignee: Proizvodstvennoe Obiedinenie "Kievpromarmatura", Kiev, U.S.S.R.

[21] Appl. No.: 800,459

[22] Filed: Nov. 21, 1985

[51] Int. Cl.[4] ............................................. F16K 31/12
[52] U.S. Cl. .................................. 137/505.25; 251/61.1
[58] Field of Search ................... 137/505.25; 251/61.1

[56] References Cited

U.S. PATENT DOCUMENTS

| | | | | |
|---|---|---|---|---|
| 2,877,791 | 3/1959 | Rich | ............................. | 251/61.1 X |
| 2,935,083 | 5/1960 | Singer | ............................. | 137/505.25 |
| 3,078,066 | 2/1963 | Moore | ............................. | 251/61.1 |

FOREIGN PATENT DOCUMENTS 2701079  7/1977  Fed. Rep. of Germany ........................ 137/505.25

Primary Examiner—Harold W. Weakley
Attorney, Agent, or Firm—Burgess, Ryan & Wayne

[57] ABSTRACT

A liquid pressure regulator comprises a housing having inlet and outlet chambers, a seat in the form of a hollow cone with perforations in the inlet chamber, and a liquid flow controlling member fashioned as a single elastic element including a first portion in the form of a membrane secured in the outlet chamber, a second portion in the form of a second membrane secured in the housing at the seat base, and a third portion which connects the first and second portions and has a central hole partially tapering in the area of the thus obtained gate to mate with the tapered surface of the seat.

3 Claims, 2 Drawing Figures

LIQUID PRESSURE REGULATOR

FIELD OF THE INVENTION

This invention relates to systems for controlling non-electric quantities, and more particularly to liquid pressure regulators.

The pressure regulator embodying the present invention can be used in pheumohydraulic systems of various machines, as well as in water supply pipeline systems of high-rise apartment houses.

BACKGROUND OF THE INVENTION

There is known a pressure regulator comprising a housing accommodating a straight-flow non-sealed gate member which includes tubular and disk-like portions rigidly interconnected therebetween; an adjustment spring being arranged inside the housing separated from the flow-through portion by seals, whereas an adjusting nut is provided at the outer portion of the housing (cf., e.g., USSR Inventor's Certificate No. 192,575, IPC F 06 k, published Mar. 6, 1967).

This pressure regulator is sufficiently small-size and simple to construct, although it is disadvantageous because of making use of movable (slidable) sealing connections. Friction forces in connections of this type are always pronounced at the initial stages of operation to affect reliable operation and cause self-oscillations; whereas after an extended use such friction forces tend to reduce to result in a possible failure due to resilient resonant oscillations caused by fluctuations in the pressure of liquid. In addition the adjustment spring in the above pressure regulator is highly susceptible to corrosion due to contact with the fluid tending to leak through the sliding seals.

There is also known a liquid pressure regulator comprising a housing having inlet and outlet chambers, an adjustment arrangement in the form of a spring, a pressure-sensitive element disposed in the outlet chamber of the housing, and a means for controlling the flow of liquid fashioned as a hollow resilient body of spherical shape fabricated from an elastic material and arranged inside the housing. Adapted to cooperate with this means is a seat which forms a gate therewith. The seat has the form of a hollow cone having perforations at the tapered surface thereof, disposed at the inlet chamber of the housing and facing by its base the outlet chamber of the housing (cf., e.g., USSR Inventor's Certificate No. 359,640, IPC G 05 d 16/6, published Jan. 9, 1973).

A change in the outlet pressure upsets the equilibrium of forces at the pressure-sensitive element, whereby the prevailing force is transmitted to the means for controlling the flow of liquid to deform the resilient body and change the number of open perforations in the seat.

Inherent in the aforedescribed pressure regulator is a disadvantage of possible skewing of the means for controlling the flow of liquid, which results in less accurate performance and reduced reliability of the pressure regulator. Contaminants and solid particles present in the liquid tend to accumulate in the center of the tapered seat. This in turn affects performance characteristics of the pressure regulator after a certain service time to necessitate its periodical disassembly and cleaning. In addition, another disadvantage resides in that the pressure regulator is structurally complicated and difficult to manufacture.

SUMMARY OF THE INVENTION

It is therefore an object of the present invention to provide a liquid pressure regulator which would be highly reliable in operation thanks to simplifying it structurally.

Another object is to provide a liquid pressure regulator which would be less susceptible to the contaminants carried by the liquid.

One more object is to ensure a more accurate pressure control through preventing possible skewing of a means for controlling the flow of liquid.

Still another object is to provide a liquid pressure regulator which would be simple to fabricate.

The objects of the present invention are attained by that in a liquid pressure regulator comprising a housing having inlet and outlet chambers, a pressure-sensitive element disposed in the outlet chamber of the housing, a member for controlling the flow of liquid fabricated from an elastic material and disposed inside the housing, and a seat fashioned as a hollow cone having perforations and disposed in the inlet chamber of the housing, this seat being engageable with the flow controlling member and forming a gate therewith, according to the invention, the flow controlling member is fashioned as a single elastic element made up of a first portion in the form of a membrane secured in the outlet chamber of the housing, a second portion in the form of a second membrane secured in the housing at a base of the seat, and a third portion connecting the first and second portions and having a central hole partially tapering in the zone of the gate to mate with a tapered surface of the seat, whereas the seat is accommodated at the side of the inlet chamber of the housing.

Preferably, the perforations at the tapered surface of the seat have the form of holes equidistantly spaced about the circumference of this surface at least at two levels in terms of the height of the seat, the first level of such holes being substantially in the plane where the second portion of the flow controlling member is secured at the base of the seat.

Alternatively, the elastic element is reinforced.

BRIEF DESCRIPTION OF THE DRAWINGS

The invention will be more fully apparent and other attending advantages more completely understood from a more detailed description of preferred embodiments thereof taken in conjunction with the accompanying drawings, in which:

With reference to FIG. 1 of the accompanying drawings, a liquid pressure regulator according to the invention comprises a housing 1 (FIG. 1) having top and bottom flanges 2 and 3, respectively, and accommodating a pressure-sensitive element 4 and a member 5 for controlling the flow of liquid fabricated from an elastic material. A seat 6 cooperates with the member 5 to form a gate therewith.

Figure 1:
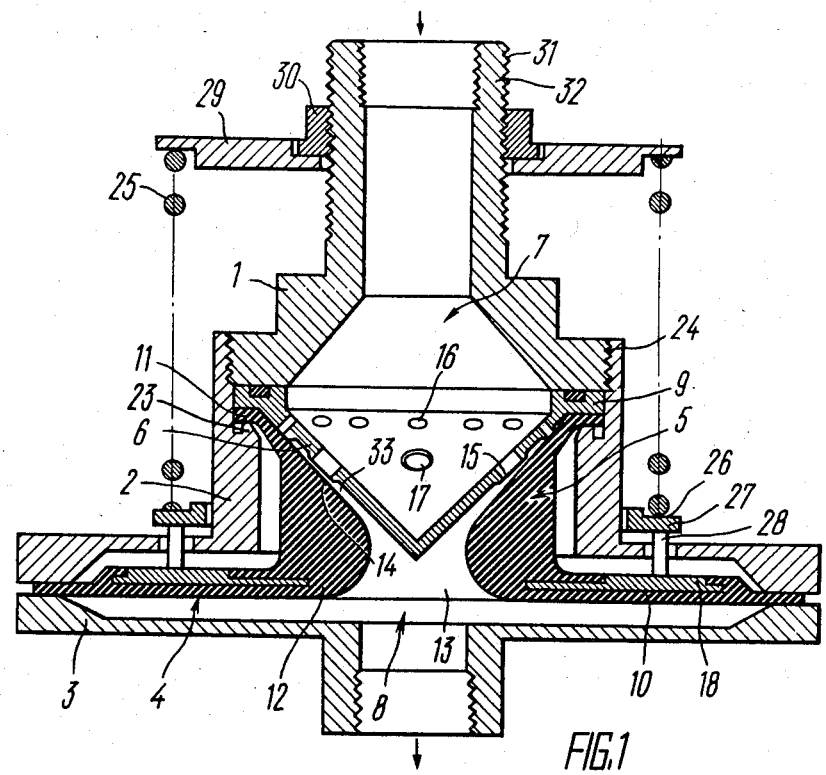
FIG. 1 is a longitudinal sectional view of a liquid pressure regulator according to the invention.

These elements of the pressure regulator divide the housing 1 into inlet and outlet chambers indicated by 7 and 8, respectively.

The seat 6 is fashioned as a hollow cone (alternatively, a truncated cone) a base 9 of which is at the side of the inlet chamber 7 of the housing 1. The tapered surface of the seat 6 has perforations to communicate the chambers 7 and 8.

The member 5 for controlling the flow of liquid has the form of an integral elastic unit which includes three portions 10, 11 and 12.

The portion 10 is generally a membrane secured in the outlet chamber 8 between the top and bottom flanges 2 and 3 to function as the pressure-sensitive element 4.

The portion 11 also has the form of a membrane secured at the base 9 of the seat 6 in the housing 1.

The portions 10 and 11 are connected by the portion 12 having a central hole 13 with a tapered surface 14 substantially conforming in configuration to a tapered surface 15 of the set 6 for these two surfaces to mate.

The perforations on the tapered surface 15 of the seat 6 have the form of holes 16 and 17 spaced equidistantly and circumferentially in two levels in terms of the height of the seat 6. The holes 16 rest in a plane where the portion 11 is secured at the base 9 of the seat 6.

Figure 2:
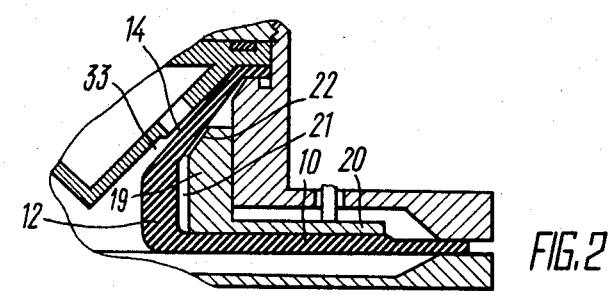
FIG. 2 is a partial sectional view of a member for controlling the flow of liquid.

The elastic element is reinforced, such as by a plate 18 arranged at its portions 10 and 12 as seen best in FIG. 1, or, alternatively, by a sleeve 19 (FIG. 2) having a flange 20 at the portion 10, this sleeve 19 being arranged so as to allow a clearance 21 at the portion 12 of the member 5 and have a tapered surface 22 corresponding in shape to the shape of the tapered surface 14.

By the base 9 (FIG. 1) of the seat 6 the second membrane (viz., portion 11) is pressed to a shoulder 23 of the flange 2 thanks to that the housing 1 is threadedly connected to the flange 2 as indicated at 24.

The pressure regulator is also provided with an adjustment arrangement which comprises a spring 25 bearing by its lower base on a surface 26 of a washer 27. This washer 27 is connected through a pusher 28 to the surface of the first membrane (vis., portion 10 of the member 5). The upper base of the spring 25 bears on a washer 29 connected to an adjustment nut 30 rotatable about a threaded connection 31 at an outlet tube 32 of the housing 1.

Preferably, the elastic element is fabricated from rubber.

Liquid under pressure is admitted through the inlet tube 32 to enter the inlet chamber 7, be conveyed through the holes 16, 17, and choked in a space 33 between the tapered surface 14 of the adjustment arrangement 5 and tapered surface 15 of the set 6. Thereafter, the liquid enters the outlet chamber 8 and is conveyed for consumption.

The outlet pressure is adjusted by varying the force of the spring 25 by turning the adjusting nut 30.

In the outlet chamber 8 the liquid exerts pressure on the surface of the pressure-sensitive element 4. When the amount of pressure in the outlet chamber exceeds the force of the spring 25, the member 5 is caused to move toward the spring 25, whereby the surface 14 of the member 5 is brought closer to the surface 15 of the seat 6 to result in that the area of the choking space 33 therebetween tends to reduce and the pressure in the outlet chamber 8 is brought down to the required one. In response to a reduction of the outlet pressure of liquid below one preset by adjusting the spring 25, the member 5 moves in the opposite direction, whereby its surface 14 is drawn away from the surface 15 of the seat 6, whereby the area of the choke space 33 increases and the pressure in the outlet chamber grows to that which is required.

The row of holes 16 arranged substantially in a plane of attachment of the portion 11 of the member 5 ensures sufficient strength to prevent the accumulation of contaminants and solid particles in the area of contact between the member 5 and seat 6.

As compared with prior art liquid pressure regulators of similar designation, the proposed regulator offers the following advantages: higher accuracy of maintaining the outlet pressure to within ±0.01 MPa from the rated outlet pressure; high reliability in operation; estimated trouble-free performance for 8,000 hrs of 95%; and reduced susceptibility to contaminants carried by the liquid. In addition, the proposed construction of the pressure regulator makes it possible to dispense with regular disassembly and cleaning. Also, resonance oscillations of the flow controlling member are obviated, since it is made of rubber, which, in turn, simplifies the proposed pressure regulator and reduces its production costs.

The liquid pressure regulator is especially advantageous for use in water supply systems of apartment houses due to that it is simple to construct and has no elements susceptible to corrosion.

Because the proposed pressure regulator includes relatively few parts mostly made by casting, the expenses associated with materials and fabrication are considerably reduced.

A still further incrase in the service life of the pressure regulator can be attained by mereby replacing its flow controlling member.

What is claimed is:

1. A liquid pressure regulator comprising:
   a housing having inlet and outlet chambers;
   a pressure-sensitive element disposed in said outlet chamber of said housing;
   a seat in the form of a hollow cone having a base, an interior, and a tapered surface, and being secured in said housing so that said base is disposed in said inlet chamber of said housing with which said interior of said seat communicates;
   said tapered surface of said seat having perforations by means of which said inlet chamber communicates with said outlet chamber of said housing;
   a member for controlling the flow of liquid cooperating with said seat and forming a gate therewith; said flow controlling member being fabricated from an elastic material and having the form of a single elastic element including a first portion in the form of a first membrane, a second portion in the form of a second membrane, and a third portion connecting said first portion with said second portion into an integral unit;
   said first membrane being secured in said outlet chamber of said housing;
   said second membrane being secured in said housing at said base of said seat;
   said third portion having a central hole partially conical in the zone of said gate to mate with the tapered surface of said seat.

2. A pressure regulator as defined in claim 1, in which said perforations at said tapered surface of said seat are arranged equidistantly circumferentially at least on two levels of the height of said seat; one level of circumferential perforations occupying a plane at which said second portion of said elastic element is secured near said base of said seat.

3. A pressure regulator as defined in claims 1 or 2, in which said elastic element is reinforced.

* * * * *